United States Patent [19]
Kassuba

[11] Patent Number: 5,620,080
[45] Date of Patent: Apr. 15, 1997

[54] LOAD STATION FOR CONTINUOUSLY MOVING CONVEYOR

[75] Inventor: Steven M. Kassuba, Gaylord, Mich.

[73] Assignee: CSI Industrial Systems Corp., Grayling, Mich.

[21] Appl. No.: 387,552

[22] Filed: Feb. 13, 1995

[51] Int. Cl.$^6$ ....................................... A65G 17/00
[52] U.S. Cl. ........................................... 198/343.1
[58] Field of Search ............................. 198/343.1, 343.2, 198/703

[56] References Cited

U.S. PATENT DOCUMENTS

| | | | |
|---|---|---|---|
| 2,634,851 | 4/1953 | Steinhoff | 198/343.2 |
| 3,850,566 | 11/1974 | Moore | 198/343.1 |
| 5,170,546 | 12/1992 | Harris | 198/343.1 |
| 5,176,036 | 1/1993 | Harris | 198/343.1 |

*Primary Examiner*—Joseph E. Valenza
*Attorney, Agent, or Firm*—Lon H. Romanski

[57] ABSTRACT

A portion of a continuously forwardly moving conveyor is caused to move backwards or effectively stand still by virtue of making the conveyor move rearwardly.

64 Claims, 10 Drawing Sheets

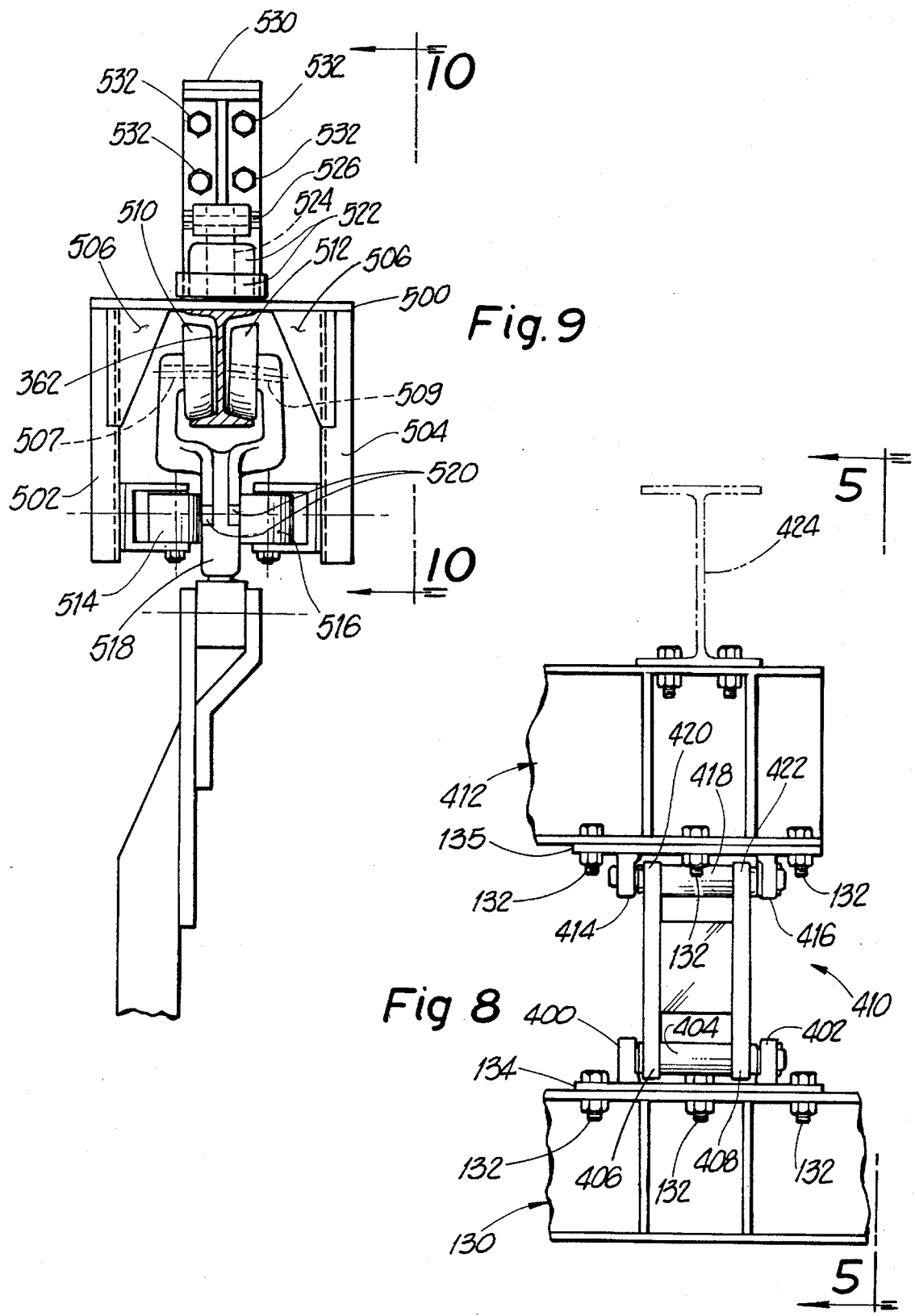

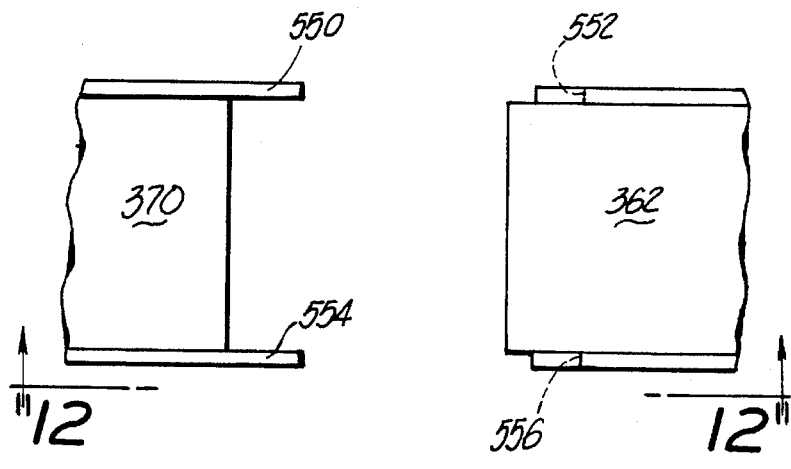
Fig. 11
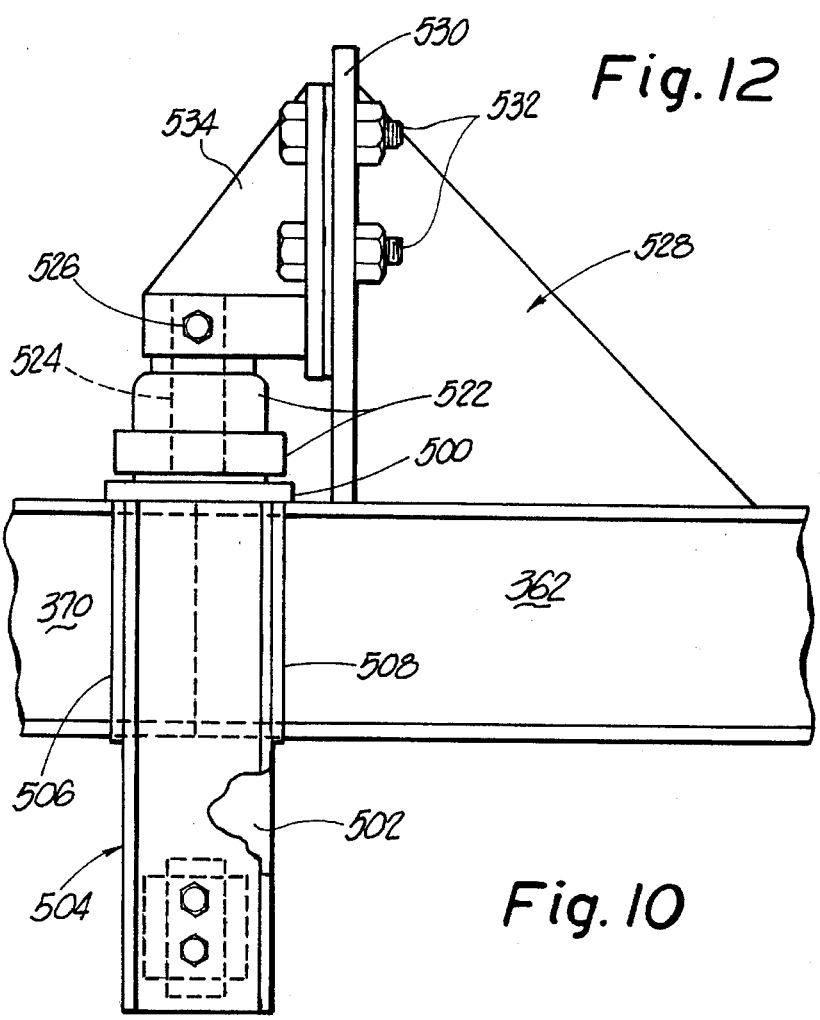
Fig. 12
Fig. 10

LOAD STATION FOR CONTINUOUSLY MOVING CONVEYOR

FIELD OF THE INVENTION

This invention relates generally to conveyors and more particularly to apparatus for enabling loading and/or unloading of conveyors when such conveyors are of the continuously moving type.

BACKGROUND OF THE INVENTION

Heretofore, as well as presently, many manufacturing plants have employed conveyors for the movement of manufactured parts and for the movement of scrap to certain areas of the plant as part of the overall system or processes for the manufacturing of the related goods.

It has not been unusual to have conveyors of such a substantial length as to make it prohibitive, time-wise and energy-wise, to stop the movement of the conveyor in order to load goods or scrap onto the conveyor or to unload goods or scrap from the conveyor. This becomes increasingly evident when one considers a moving conveyor which, in its circuit, passes a plurality of loading and/or unloading stations or area.

The prior art has attempted to load, for example, buckets carried by a continuously moving conveyor by seeking to time the discharge of scrap or goods from an associated dumping means and into a conveyor carried bucket as such conveyor and bucket moved generally toward and past such associated dumping means. Regardless of the accuracy of the timing of the discharge it is not unusual for some of the discharged goods or scrap to miss the moving bucket and fall to the floor.

The prior art has also attempted to load conveyor buckets, or more generically carriers, by causing a carrier to be momentarily held back, while the overall conveyor continued its movement, and during such a momentary stoppage of a carrier dumping the goods or scrap onto the carrier. This approach has not proven to be successful in that the momentary stopping or holding back of a carrier has shown to result in such carrier swinging much as a pendulum and thereby again resulting in some of the goods or scrap being discharged by the associated dumping means effectively missing the swinging carrier and falling as to the building floor.

The prior art has proposed various other specific systems some of which for a time disengage the bucket or carrier from the power drive of the overall conveyor to thereby have disengaged bucket or carrier standing still as to receive goods and/or scrap from an associated dumping means.

Many of the prior art systems are of limited effectiveness, or complicated and overly costly.

The invention as herein disclosed is primarily directed to the solution of the aforestated as well as other related and associated problems of the prior art.

SUMMARY OF THE INVENTION

According to the invention, apparatus for causing a continuously moving conveyor to have a portion of said conveyor become functionally standing still with respect to a selected area for a selected span of time, comprises body means, a first rotatable wheel carried by said body means, a second rotatable wheel carried by said body means, wherein said first and second rotatable wheels are each suitably secured to said body means for rotatable motion with respect to said body means, wherein said first and second rotatable wheels are so situated as to be substantially spaced from each other a preselected fixed distance, wherein the planes of rotation of said first and second rotatable wheels are generally coplanar, wherein said continuously moving conveyor in its course of movement first operatively engages a portion of said first rotatable wheel and continues in a first direction generally tangentially from said first rotatable wheel to operative engagement with said second rotatable wheel, wherein that portion of said moving conveyor which leaves tangentially from said first rotatable wheel and first tangentially engages said second rotatable wheel operatively carries a carrier and moves at the same speed as the overall continuously moving conveyor, and motor means operatively connected to said body, said motor means being at times effective to move said body and said first rotatable wheel and said second rotatable wheel in a second direction opposite to said first direction and at a speed which is substantially equal to the speed of said continuously moving conveyor.

Various objects, advantages and aspects of the invention will become apparent when reference is made to the following detailed description considered in conjunction with the following detailed description and accompanying drawings.

BRIEF DESCRIPTION OF THE DRAWINGS

In the drawings wherein for purposes of clarity certain details and/or elements are omitted from one or more views:

FIG. 8 is a view taken generally on the plane of line 8—8 of FIG. 5 and looking in the direction of the arrows;

FIG. 9 is an enlarged cross-sectional view taken generally on the plane of line 9—9 of FIG. 6 and looking in the direction of the arrows;

FIG. 10 is a relatively enlarged view taken generally on the plane of line 10—10 of FIG. 9 and looking in the direction of the arrows;

FIG. 11 is an elevational view of end portions of the conveyor track as exist in the arrangement of FIG. 10;

FIG. 12 is a view taken generally on the plane of line 12—12 and looking in the direction of the arrows.

DETAILED DESCRIPTION OF THE PREFERRED EMBODIMENT

Figure 1:
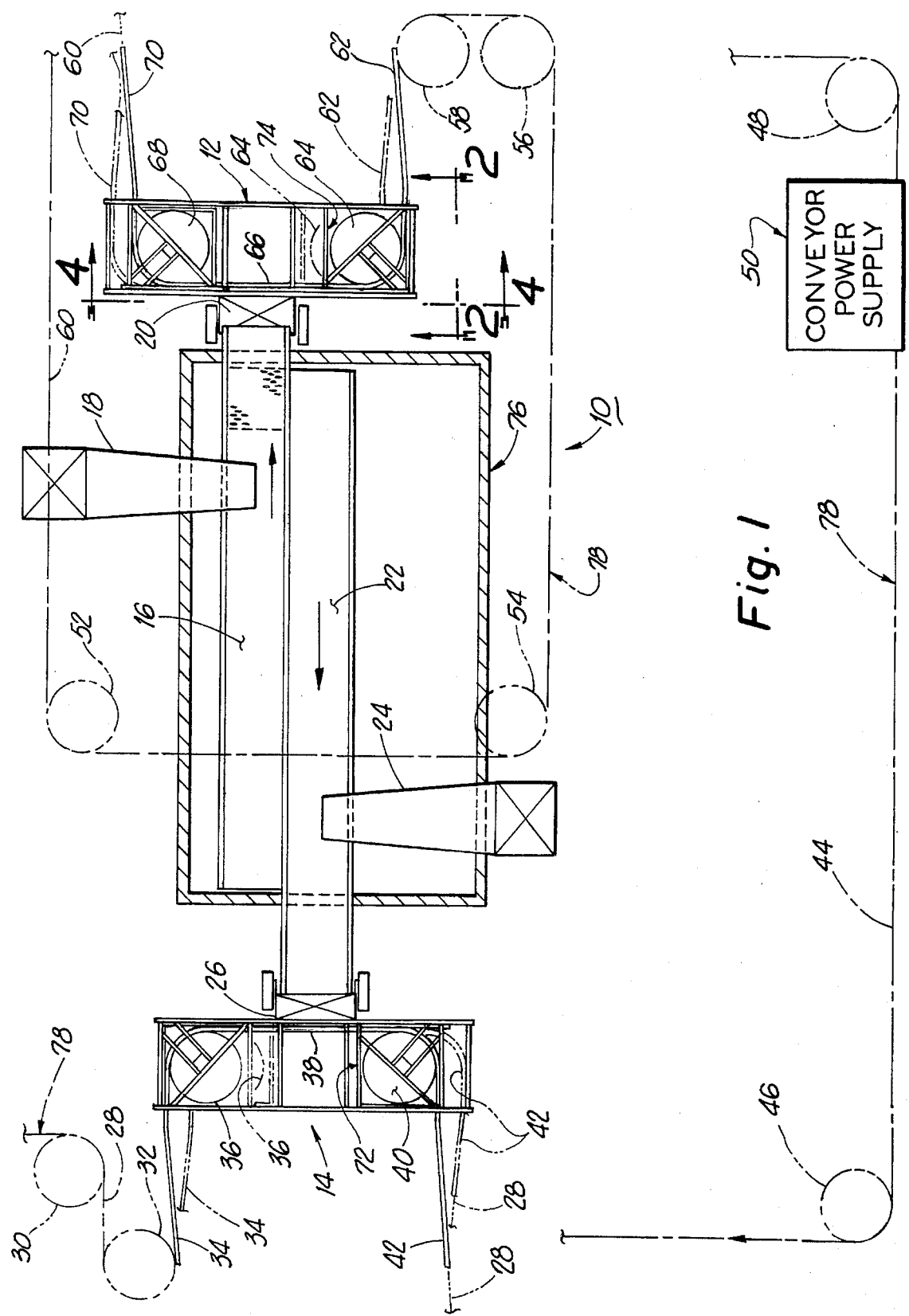
FIG. 1 is a top plan view of a simplified depiction of an overall conveyor system having, for purposes of illustration two stations at which, in the embodiment depicted, scrap and/or goods are to be respectively loaded onto carriers carried by the conveyor.
Figure 2:
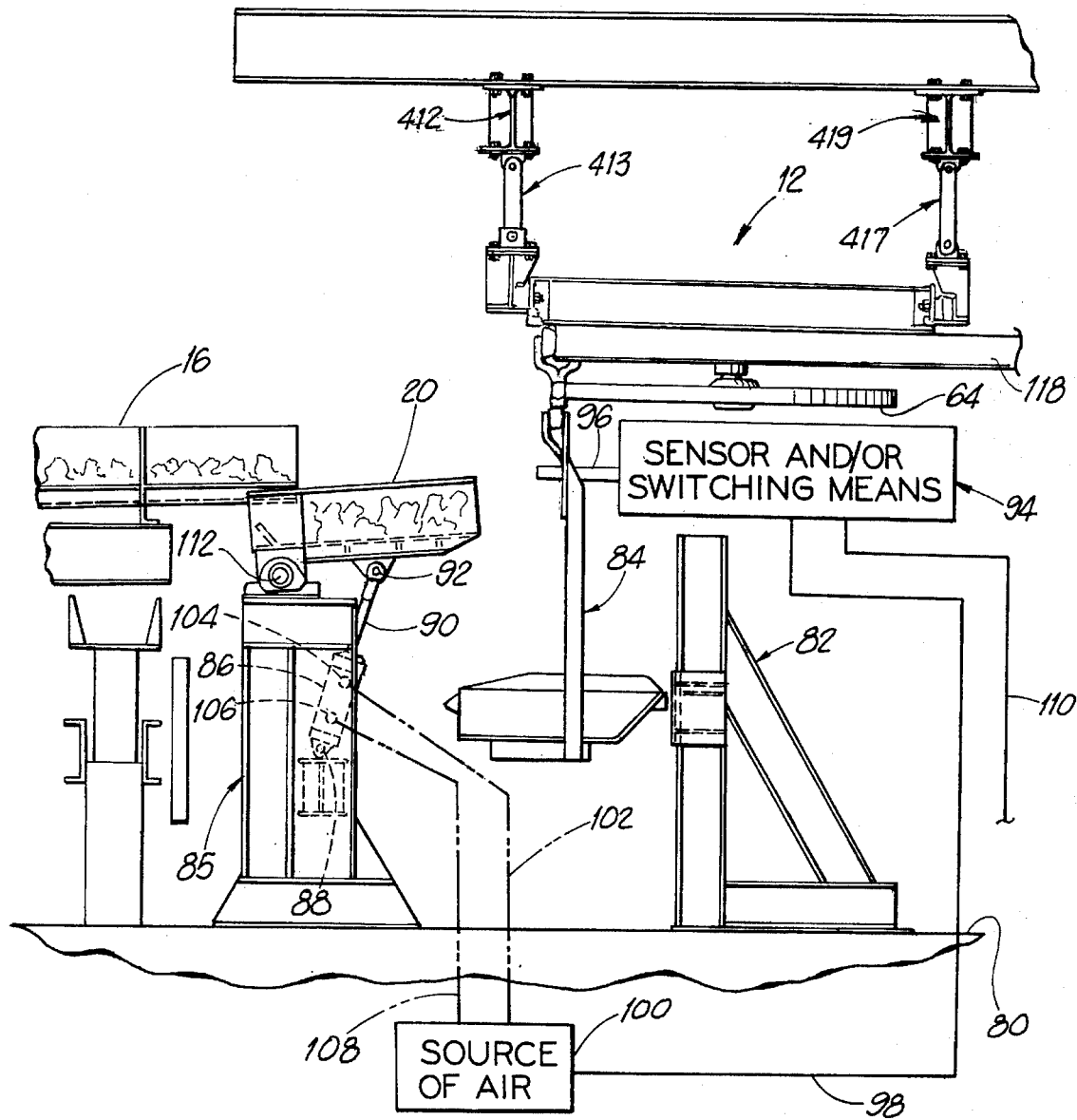
FIG. 2 is a relatively enlarged view of a fragmentary portion of the somewhat simplified structure in FIG. 1, with said view taken generally on the plane of line 2—2 of FIG. 1 and looking in the direction of the arrows.
Figure 3:
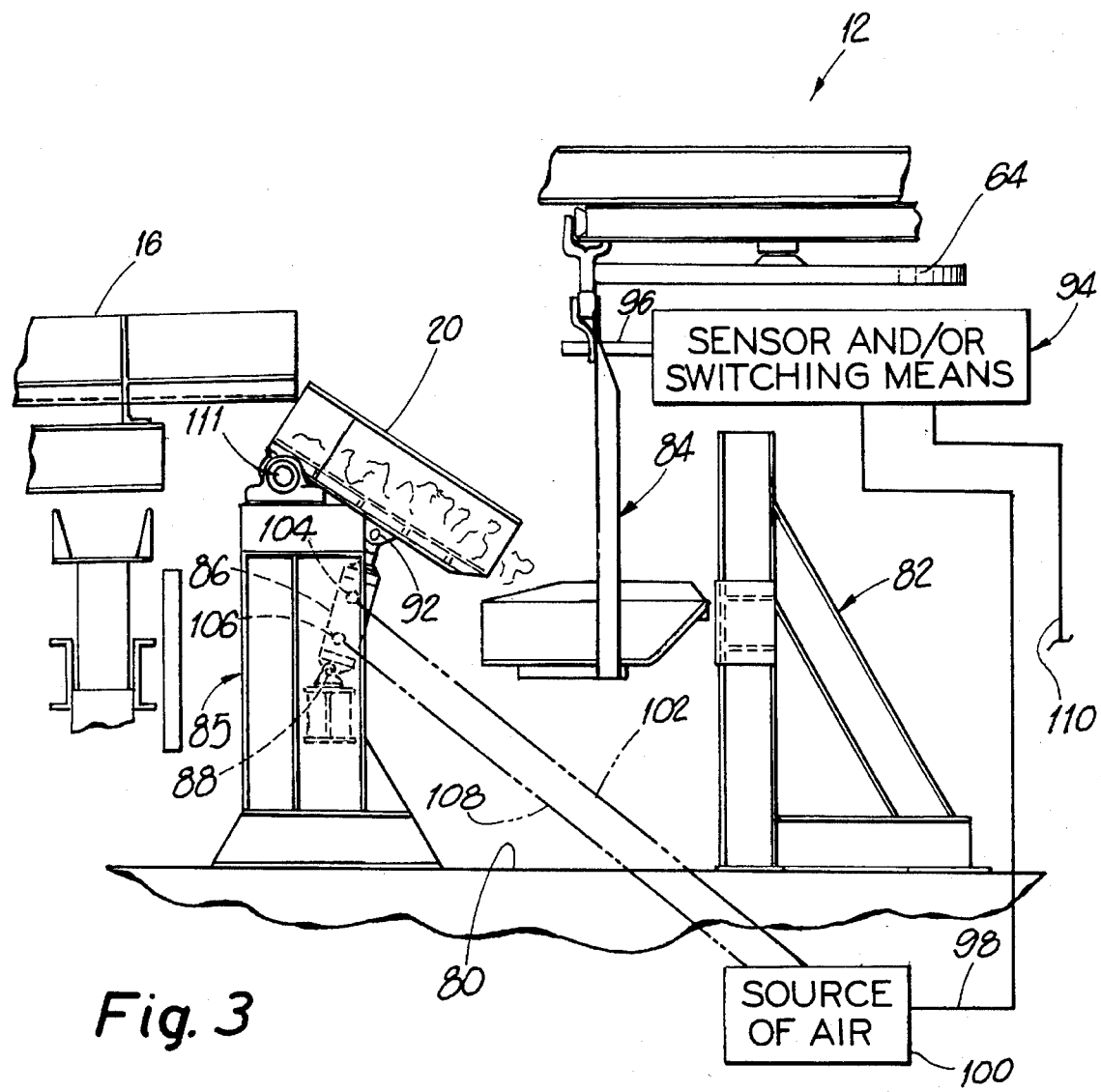
FIG. 3 illustrates most of the structure shown in FIG. 2 but in an operating position different from that of FIG. 3.

Referring in greater detail to FIG. 1, the simplified and fragmentary portion of the overall conveyor system 10 is depicted as comprising loading (or even unloading) stations 12 and 14 with a first shaker-type conveyor 16, which receives goods (or scrap) as from a chute system 18, and delivers such material to a dumping mechanism schematically depicted at 20 of FIGS. 1, 2 and 3.

A second shaker-type conveyor 22, which receives goods (or scrap) as from a chute system 24, and delivers such material to a dumping mechanism schematically depicted at 26 of FIG. 1. The dumping mechanism 26 may be considered to be functionally identical to that at 20 to be described.

The moving conveyor system is depicted in FIG. 1 by a series of conveyor segments all of which may be operationally connected to each other.

Still referring to FIG. 1 a conveyor section or portion 28 is shown operatively engaged with a turning wheel 30 and with a second turning wheel 32 whereby the moving conveyor 28 moves along guide 34 around the quarter sector of turning wheel 36 and then along the support 38 between the area of wheel 36 and leading to wheel 40. The moving conveyor section 28 then moves along the beam guide 42 in its continuing movement.

Another segment 44 of the continuously moving conveyor is shown being turned by cooperating wheel 46 while a further wheel 48 is shown also turning the segment 44. A conveyor power supply means 50 is depicted as cooperating with the overall conveyor system for providing power to the conveyor system.

Another segment of the overall continuously moving conveyor system is depicted as comprising conveyor turning wheels 52, 54, 56 and 58 with conveyor segment 60 moving around conveyor wheel 52, traversing shaker conveyors 16 and 22, continuing to move about a sector of wheel 54 and then around wheel 56 and wheel 58 from where the moving conveyor rides on and along support guide 62 and continues its movement around the quarter sector of turning wheel 64 and then along the support 66 extending between the area of wheel 64 and leading to wheel 68. The moving conveyor section 60 then moves along the beam guide 70 in its continuing movement.

As will become even more apparent, wheels 36 and 40 are fixedly pivotally connected to and carried by a body which, as depicted may take the configuration of an open-like frame assembly 72. During certain periods of operation the body or frame assembly 72 and the two wheels 36 and 40 pivotally secured thereto are moved, as a unit to the position depicted.

At other times the body or frame assembly 72 and the two wheels 36 and 40 pivotally secured thereto are moved, as a unit to position generally depicted by the phantom line portions causing the guide portions 34 and 42 to also assume the depicted phantom line positions.

As will also become even more apparent, wheels 64 and 68 are fixedly pivotally connected to and carried by a body which, as depicted may take the configuration of an open-like frame assembly 74. During certain periods of operation the body or frame assembly 74 and the two wheels 64 and 68 pivotally secured thereto are moved, as a unit to the position depicted. At other times the body or frame assembly 74 and the two wheels 64 and 68 pivotally secured thereto are moved, as a unit to the position generally depicted by the phantom line portions causing the guide portions 62 and 70 to also assume the depicted phantom line positions.

The rectangular cross-sectional structure 76 depicts what may be a sound deadening structure to somewhat minimize the noise emenating from the various goods coming down the chutes 18 and 24 as well as the shaker conveyors.

It should be noted that the continuously moving conveyor 78 (of which 28, 44, 48 and 60 comprise only portions) is a chain connected system which defines a closed loop conveyor system having roller or wheel means operatively engaging and rolling along the flanges of I-beams or the like as to thereby provide for the elevational support of the conveyor chain and of the carrier or bucket means carried by the conveyor assembly.

FIG. 2, a view taken generally on the plane of line 2—2 of FIG. 1, illustrates in enlarged scale a fragmentary portion of the shaker conveyor 16, the dumping mechanism or dumping box 20 and loading station 12.

A manufacturing floor 80 is shown as supporting a bumper or movement limiting structure 82 which is in close proximity to the carrier or bucket means 84 being driven by the chain of the conveyor system. A pedestal 85 is shown supporting the dumping means 20 and an air piston cylinder assembly 86 anchored as at 88 to the pedestal 85 with its piston shaft 90 being pivotally connected as at 92 to the dumping box 20.

In looking at both FIG. 1 at the plane of line 2—2 thereof and looking at FIG. 2, it can be assumed that the carrier or bucket means 84 and roller support have just, in its movement, reached the diametrical (shown) left on turning wheel 64. Further movement or travel of the conveyor system occurs along the substantially straight I-beam or track support 66 (FIG. 1) and at a preselected location a suitable sensor and/or switching means 94 will, as through suitable switch arms or the like 96, be acted upon, directly or indirectly, by the moving bucket or carrier means 84.

When the carrier or bucket means 84 has been moved sufficiently by the straight section 66 (FIG. 1), the carrier means 84 come into general operational alignment with the dumping means 20 and actuates the sensor arm 96 thereby producing a signal as on output conductor means 98 leading to a source 100 of motive fluid or air causing such air or motive fluid to flow via conduit means 102 through an aperture 104 of assembly 86 causing the piston and piston shaft to be drawn into the assembly of 86 while the other air or motive fluid on the other side of the piston is expelled via aperture 106 as to return to source 100 via conduit means 108.

Another thing occurs when the carrier means 84 is sensed as having been moved, within or by the general conveyor system, to a preselected location or position as contemplated and depicted by FIGS. 2 and 3. At that time, as generally depicted, carrier or bucket means 84 becomes generally juxtaposed to a back-up structure 82, which may have significant linear length, as to preclude any goods or scrap being dumped by dump or discharge box or means 20 from hitting the bucket means 84 and bouncing out of such rearwardly (as shown to the right).

As was already mentioned, when the carrier 84 arrives at its preselected location along 66 (FIG. 1) not only is the discharge means 20 actuated about its pivot 111 but the entire loading station is also actuated.

Figure 5:
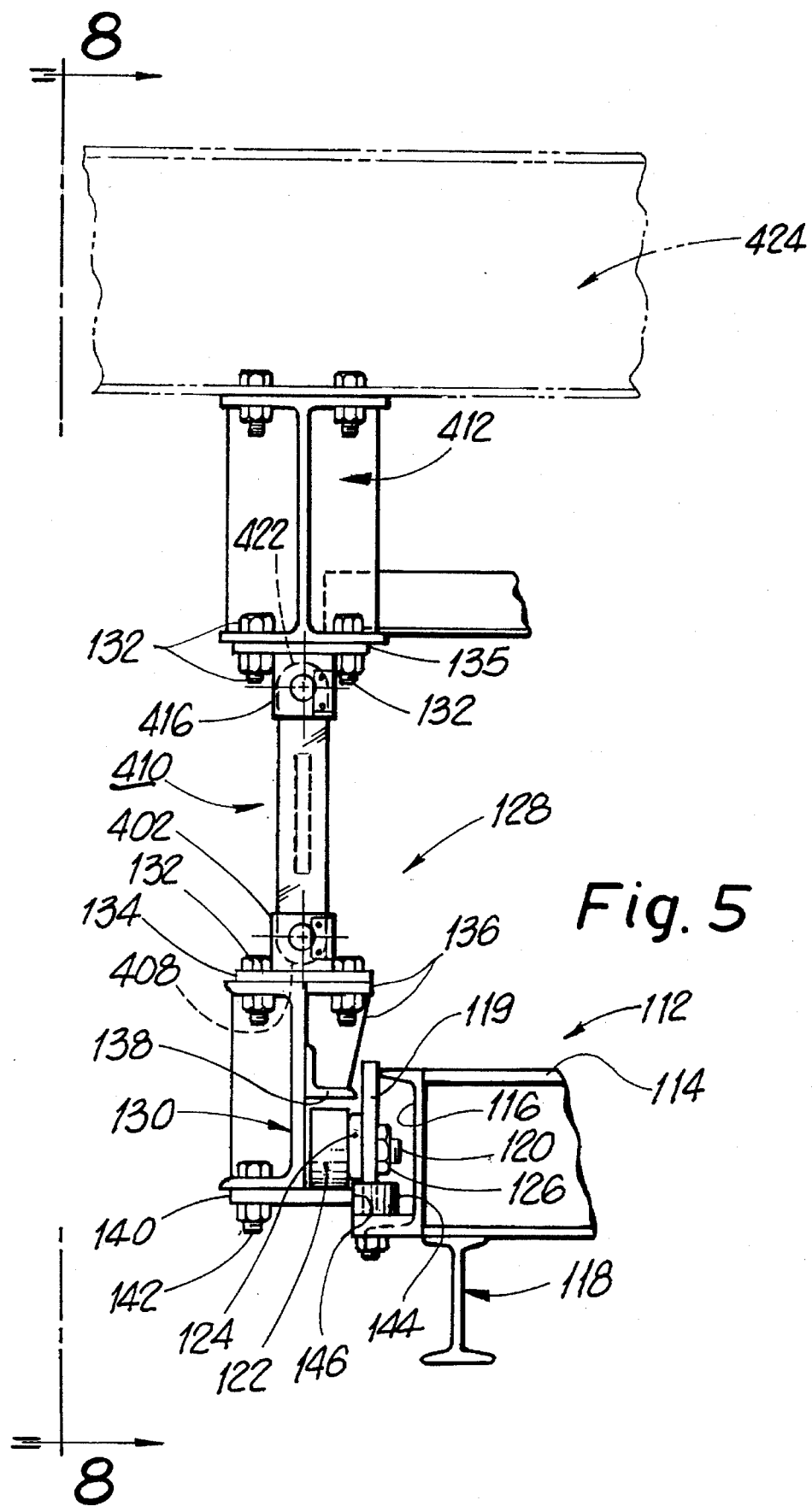
FIG. 5 is a relatively enlarged cross-sectional view taken generally on the plane of line 5—5 of FIG. 4 (or line 5—5 of FIG. 8) and looking in the direction of the arrows.

That is, as somewhat best shown in FIG. 5 an inner body 112 (fragmentarily shown) comprised of a C-channel end member 114 carries a side outer C-channel 116 secured to member 114. An I-beam conveyor track 118 is fixedly carried beneath 114 and suitably secured thereto. A generally flat plate 119 secured to the flanges of the C-channel 116 has passage means formed therethrough which permits the extension therethrough of an axle 120 of a roller or wheel 122 provided with a bearing and nut 126. The C-channels 114 and 116 as well as the conveyor track I-beam 118 comprise a portion of a first body or inner body 112.

Figure 4:
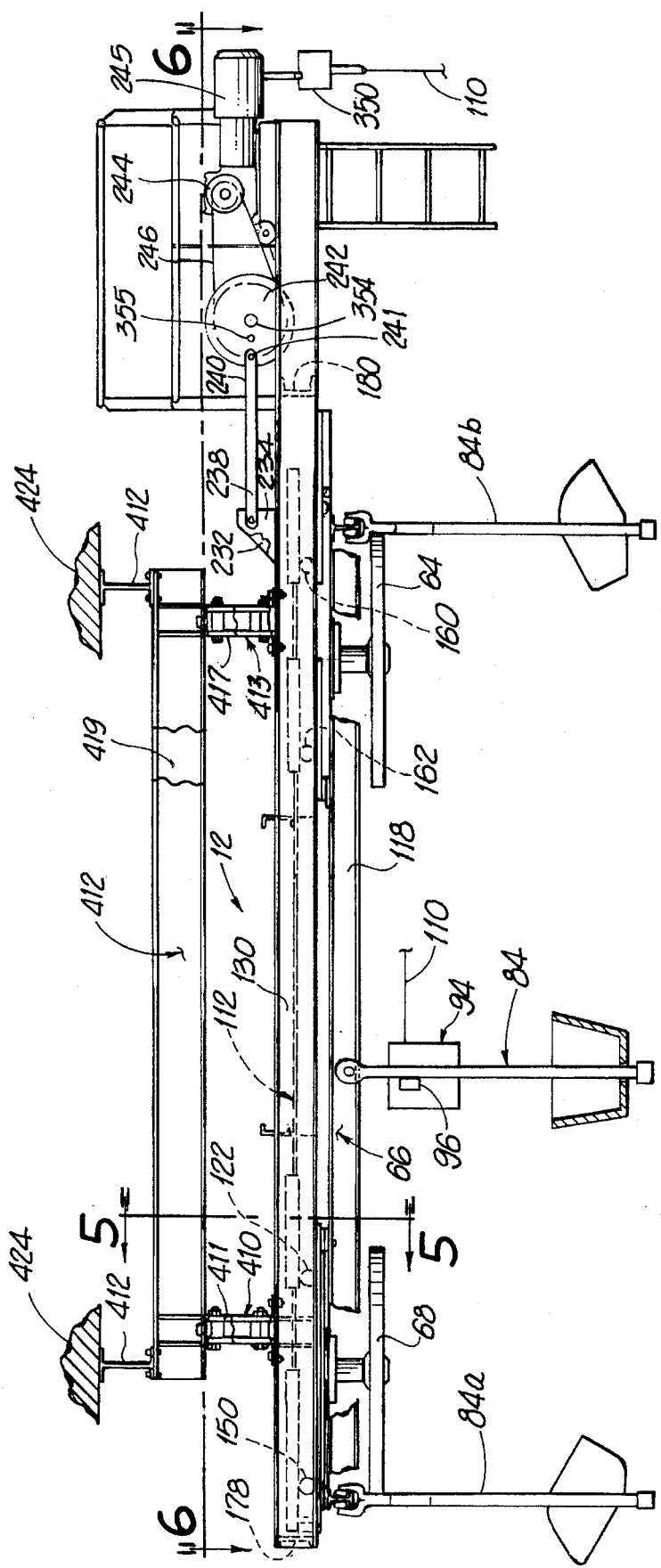
FIG. 4 is an enlarged elevational view taken generally on the plane of line 4—4 of FIG. 1 and including details and subassemblies not shown in FIG. 1.
Figure 6:
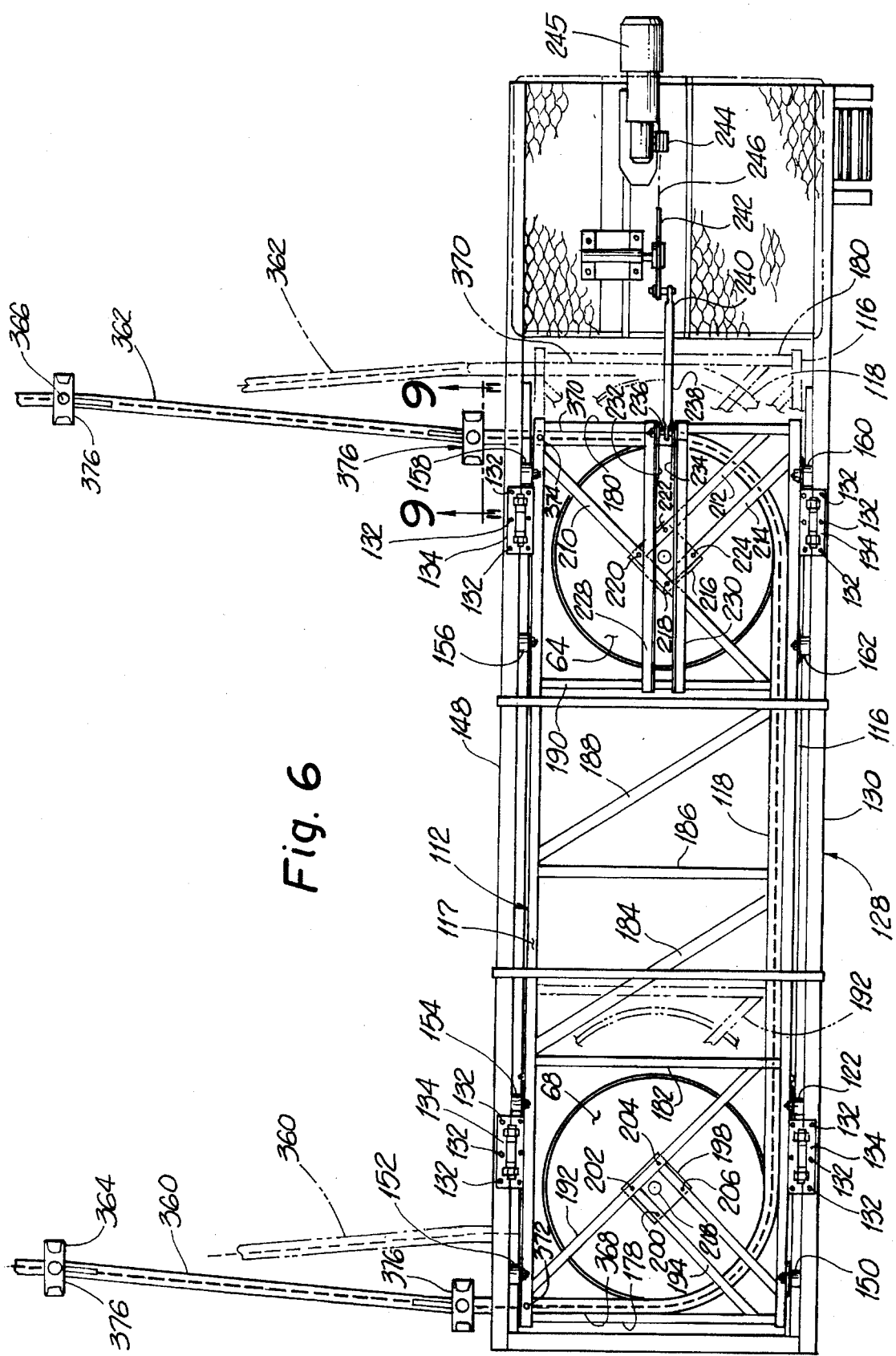
FIG. 6 is a view taken generally on the plane of line 6—6 of FIG. 4 and looking in the direction of the arrows.

As shown in FIGS. 4, 5 and 6 an outer body 128 generally peripherally surrounds the inner body 112. As shown in relatively enlarged detail in FIG. 5, the outer body 128 is depicted as comprising a longitudinally extending C-channel 130 which at its upper end is secured as by bolts 132 to a horizontally extending plate portion 134 which, in turn, at the inner side of the C-channel 130, is secured to a bracket 136 having a lower disposed angle abutment 138. The lower flange of C-channel 130 has a horizontally extending plate 140 secured thereto as by bolts 142. Plate 140 serves to apply a vertical support to wheel or roller 122 while abutment or stop 138 prevents the roller 122 from being accidentally relatively upwardly dislodged. Also, plate 140 provides a surface upon which roller or wheel 122 may rollingly move generally toward and away from the plane of the drawing.

An additional roller or stop 144 is shown carried as on the lower flange of C-channel 116. The purpose of such roller 144 is to rollingly abut against edge 146 of plate 140 as to prevent the outer frame or body 128 and inner frame or body 112 from undesirably engaging each other; i.e., the inner body or frame 112 is assured a medial position within outer frame or body 128 and longitudinally between the longitudinally extending side C-channels 130 and 148 (see FIG. 6).

Figure 7:
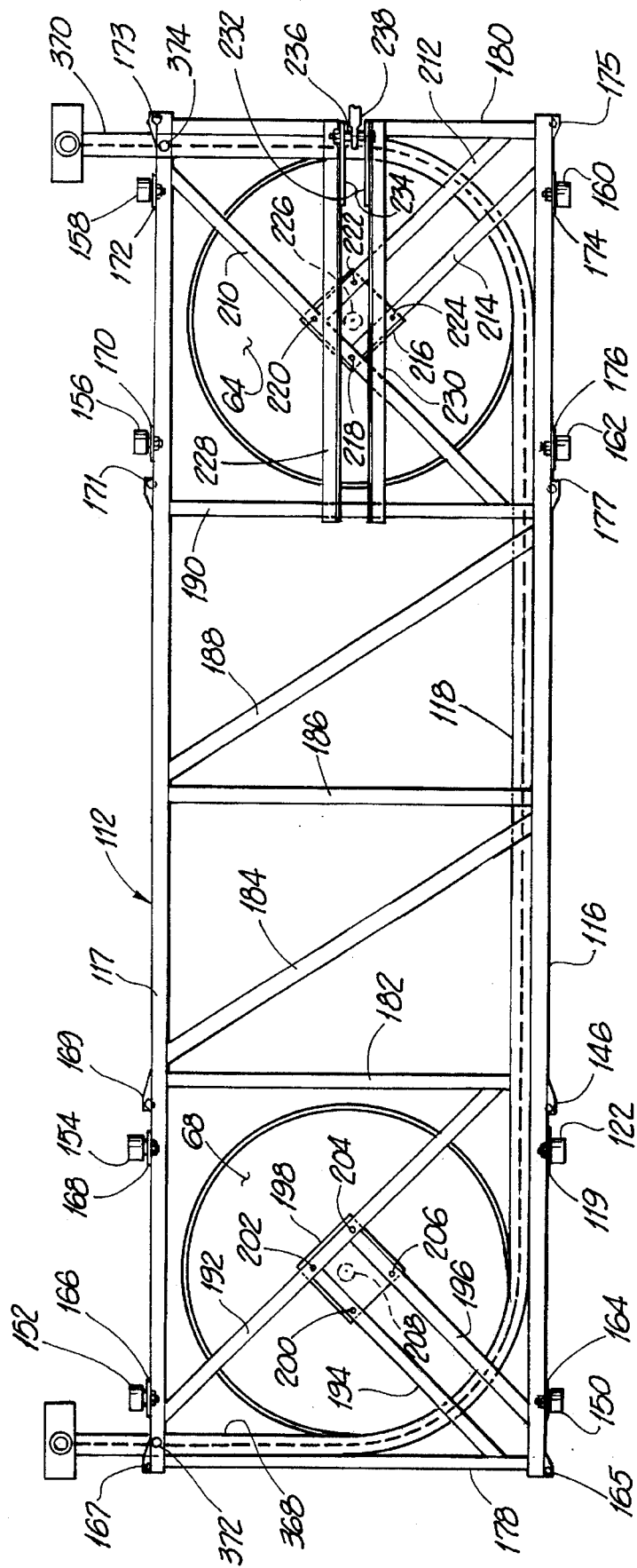
FIG. 7 is a view taken in the manner of FIG. 6, but somewhat enlarged, with the outer frame or body removed.

FIGS. 6 and 7 further depict rollers 150, 152, 154, 156, 158, 160 and 162. Also, plates, functionally equivalent to plate 119, are respectively depicted, in FIG. 7, at 164, 166, 168, 170, 172, 174 and 176. In the preferred embodiment sections of C-channel are secured to side C-channels 116 and 117 as at 178 and 180 to complete the ends of the inner frame assembly 112.

As also best seen in FIG. 7, the inner frame or carrier 112 is provided with a plurality of roller abutments, functionally equivalent to 144 of FIG. 4, as depicted at 165, 167, 169, 171, 173, 175, and 177.

Still referring to FIG. 7, a plurality of bracing and strengthening members 182, 184, 186, 188 and 190 are provided generally transversely and suitably fixed or secured to side C-channels 116 and 117.

Still referring to FIG. 7, a first plurality of support members 192, 194 and 196 are provided for the support of turning wheel 68. That is, member 192 is secured at its opposite ends to C-channel 117 and to brace 182 while support member 194 is secured at one end to end C-channel 178 and at its end to support 192; member 196, similarly, has one end secured to C-channel 116 and its other end secured to support member 192. A bearing box or plate structure 198 is secured as at 200, 202, 204 and 206 to the support members 192, 194 and 196, and rotatably carries the pivot shaft 208 of wheel 68.

A second plurality of support members 210, 212 and 214 are provided for the support of turning wheel 64. That is member 210 is secured at its opposite ends to C-channel 117 and to brace 190 while support member 212 is secured at one end to end C-channel 180 and at its other end to support 210; member 214, similarly has one end secured to C-channel 116 and its other end secured to support member 210. A bearing box or plate structure 216 is secured as at 218, 220, 222 and 224 to the support members 210, 212 and 214 and rotatably carries the pivot shaft 226 of wheel 64.

FIGS. 6 and 7, along with FIG. 4, illustrate a pair of angle steel bars 228 and 230 fixedly secured as to end C-channel 180 and transverse strut 190. In the preferred embodiment a pair of generally triangular metal members 232 and 234 are fixedly secured (possibly as by welding) respectively to bars 228 and 230. A bolt 236 or other suitable member extends transversely of and through members 232 and 234 and is suitably connected to one end of a motion transmitting rod or shaft 238 which, in turn, has its other end 240 operatively connected as to a journaled rotary member 242 which is driven as by an electrically driven sheave 244 (via electric motor 245) with a drive belt or drive chain 246 interconnecting the sheave 244 and driven wheel 242.

When a carrier or bucket 84 while being normally moved by the interconnecting chain of the conveyor system, reaches a preselected area the sensor 96, as previously discussed with reference to FIGS. 2 and 3, causes an electrical output signal along conductor 110 leading as to an electrically actuated timer means, or other desired electrical control means, 350 leading to the electric motor 245. In the preferred arrangement, upon energization of the motor 245 end 240 starts to travel in a clockwise direction about shaft 354 thereby causing motion transmitting member 238 to move generally to the right and thereby move members 232 and 234 to the right (as viewed in FIG. 4). That is, looking at FIGS. 7 and 6, the entire inner frame or body assembly 112, including turning wheels 68 and 64. In so doing the inner frame or body assembly 112 ultimately are moved to the right as depicted in phantom line in FIG. 6. The situation at this time is that as the carriers or buckets 84 are moved along the conveyor I-beam track 118, moving from tangential contact with turning wheel 64 toward tangential contact with turning wheel 68, at a preselected point in its travel the electric motor 245, provided with a speed setting rheostat, initiates the movement of the inner frame assembly the two turning wheels and the length of conveyor at least tangent to both turning wheels in the right direction opposite to the normal direction of movement of the conveyor. The speed of the movement of the inner frame 112 can be made equal to the speed of the conveyor in the opposite direction thereby enabling the dumping of parts and/or scrap into the "apparently" standing still bucket.

In the preferred embodiment the arms or straight sections 360 and 362 of the conveyor system are fixedly pivoted at 364 and 366. The shorter sections 368 and 370 are secured as at 372 and 374 to the side C-channel 117 so that left or rightward movement of inner frame causes the shorter I-beam sections 368 and 370 to move with the frame 112.

As the inner frame or body means 112 is moved to its right most location the section of track 360 moves from its solid line position to its phantom line position. Similarly, track 362 moves from its solid line position to the phantom line position 362. The connectors 376 may be considered as being the same in that each provides for the movement along the joined or articulated I-beams of the conveyor system.

The track sections 368 and 370 are in fixed position; therefore, the movement of 360 to the phantom line position and the movement of 362 to its phantom line position results in an increase and decrease in the effective lengths of 360 and 362 thereby requiring, in the preferred embodiment the provision of compensating means.

Such compensating means are disclosed as in FIGS. 4, 5 and 6. Referring in greater detail to FIGS. 5 and 8, the outer frame or body 128 is illustrated as comprising a longitudinally extending C-channel 130 which carries atop a plate 134 which is fixedly secured as by a plurality of bolts and nuts 132. A pair of trunion-like members 400 and 402 receive and retain a trunion pin 404 which, in turn, is rotatably received through legs 406 and 408 of the joining structure 410. The upper end of the interconnecting structure 410 is similar in that a plate 135 is fixedly secured via bolts 132 to the lower flange of the support member 412. A pair of trunions 414 and 416 receive and retain a trunion pin 418 which, in turn, is rotatably received through legs 420 and 422 of the joining structure 410. The upper phantom line I-beam 424 indicates that the overall structure can be supported from above.

These knuckle-like pivot structures permit the straight I-beam sections 360 and 362 to swing to the phantom line positions depicted at 360 and 362 without causing any binding or mechanical interference during operation of the invention.

FIG. 9 is an enlarged cross-sectional view taken generally on the plane of line 9—9 of FIG. 6 and looking in the direction of the arrows.

Referring in greater detail to the drawings, and in particular to FIGS. 9 and 10 (the drawing in FIG. 10 being relatively enlarged compared to the drawing of FIG. 9).

The I-beam conveyor track 362 is suitably secured at its upper flange to a transverse, for example, steel plate member 500. Depending C-channel members 502 and 504 are secured, as by welding, and pairs of gusset members 506 and 508 are secured to opposite sides of the members 502 and 504.

A clevis provided with axle-like portions 507 and 509 is operatively connected to wheels 510 and 512 which ride upon the opposite lower flanges of the I-beam 362. A pair of rollers 514 and 516, carried by the depending portions 502 and 504 and serve to closely confine the depending single body 518 and the conveyor chain 520 connected to body 518.

Referring to both FIGS. 9 and 10, a bearing assembly 522 is held down by means of cylindrical member 524 which is effectively locked by the bolt or screw member 526.

As best seen in FIG. 10 a supporting gusset assembly 528 is suitably welded to the top of I-beam 362 and the forwardly situated wall 530 of the gussett assembly is connected via screws 532 to the gussett 534 associated with bearings 522.

In the preferred embodiment in those situations where the I-beam track is to undergo at least partial rotation, it is preferred that the cooperating ends of such I-beams be formed as illustrated in FIGS. 11 and 12.

When the portions are brought together the top portion 550 is received in the circular recess 552 and the same occurs with the bottom portion 554 which is received in the circular recess 556. Further, in doing this the web comes together by having the extending portion 558 terminate at the center of revolution and there become operatively juxtaposed to the connecting web portion 560.

Figure 13:
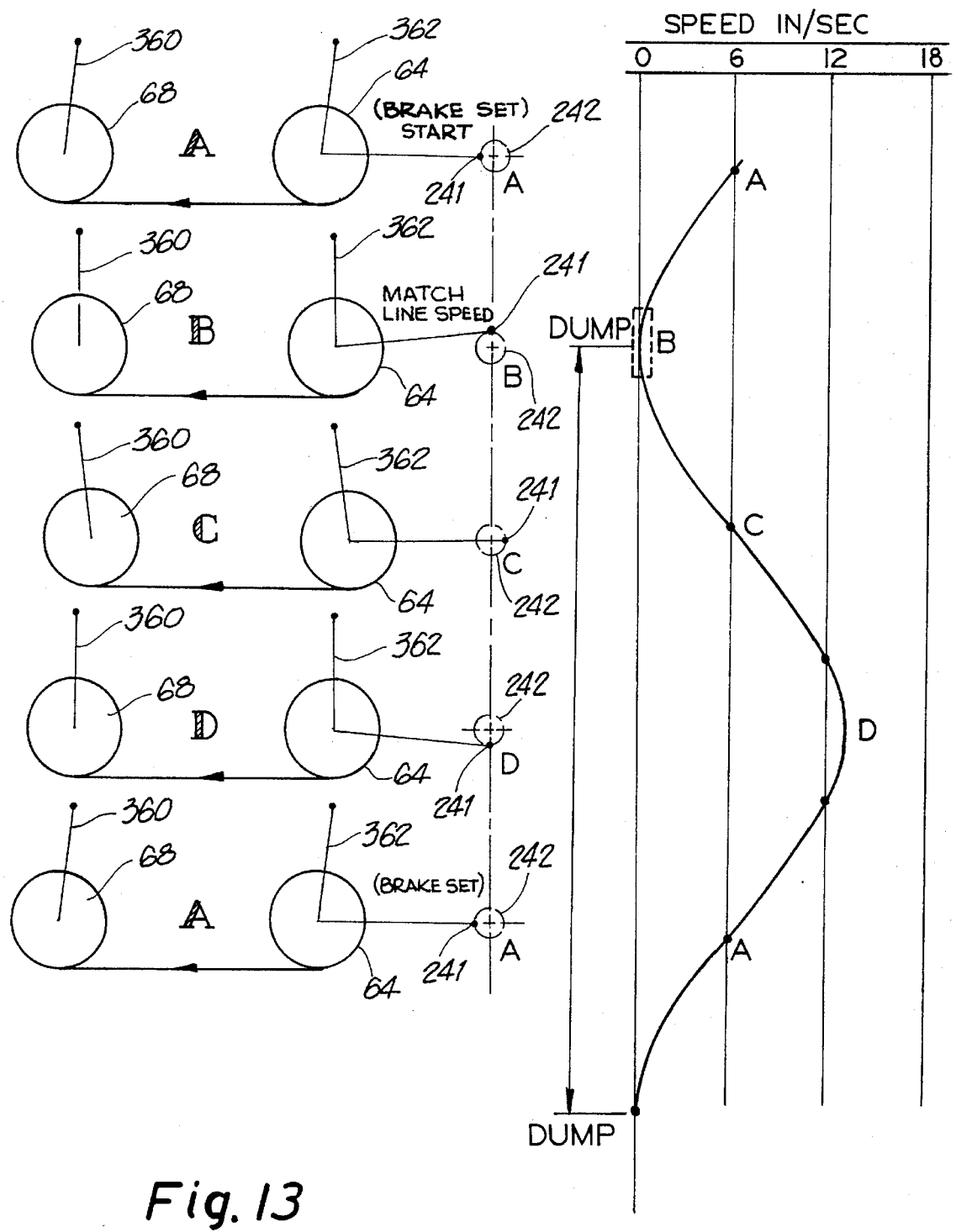
FIG. 13 is a graphic illustration of the preferred operation of the invention and the relative speeds of the considered carriers or buckets.

FIG. 13 schematically, illustrates the operation of the two turning wheels and the conveyor and bucket between them. In the conditions depicted at A, B, C, D and A of Figure 13 the lines 360 and 362 are positioned to correspond to the positions which the I-beams 360 and 362 may well assume during the time that motor 245 is energized and inner body or frame means 112 is moved in a direction generally opposite to the motion of the conveyor.

As can be seen the speed of the conveyor in the B situation is the same speed brought about by the motor 245 (FIG. 4). Accordingly the bucket carried by the conveyor can easily be filled without any goods or scrap falling out and onto the floor. It can be seen that the speed of deceleration of the bucket as it approaches point B is very little and it can also be seen that the speed of acceleration of the bucket as it leaves point B is also very little. Therefore, a window of opportunity can be established to both sides of point B which will not result in any disruptive dumping into the related bucket. The speed of the motor 245 can of course be varied to what should become desired and additional holes may be formed in the rotary member or driver wheel 242 as shown at 355 by way of example.

Although only a preferred embodiment of the invention has been disclosed and described, it is apparent that other embodiments and modifications are possible within the scope of the appended claims.

What is claimed is:

1. Apparatus for causing a continuously moving conveyor to have a portion of said conveyor become functionally standing still with respect to a selected area for a selected span of time, comprising body means, a first rotatable wheel carried by said body means, a second rotatable wheel carried by said body means, wherein said first and second rotatable wheels are each suitably secured to said body means for rotatable motion with respect to said body means, wherein said first and second rotatable wheels are so situated as to be substantially spaced from each other a preselected distance, wherein the planes of rotation of said first and second rotatable wheels are generally coplanar, wherein said continuously moving conveyor in its course of movement first operatively engages a portion of said first rotatable wheel and continues in a first direction generally tangentially from said first rotatable wheel to operative engagement with said second rotatable wheel tangentially thereof, wherein that portion of said moving conveyor which leaves tangentsally from said first rotatable wheel and first tangentially engages said second rotatable wheel operatively carries a carrier and moves at the same speed as the overall continuously moving conveyor, motor means operatively connected to said body means, said motor means being at times effective to move said body means and said first rotatable wheel and said second rotatable wheel in a second direction opposite to said first direction and at a speed which is substantially equal to the speed of said continuously moving conveyor, deflectable suspension means operatively supporting said body means and said first and second wheels, wherein said first and second wheels define a line of centers, and wherein said deflectable suspension means enables said body means and said first and second wheels to undergo motion transverse to said line of centers.

2. Apparatus according to claim 1 wherein said body means comprises a first body structure and a second body structure, wherein said first and second rotatable wheels are operatively carried by said first body structure, wherein said deflectable suspension means enables both said first body structure and said second body structure to move in directions transverse to said line of centers, wherein said deflectable suspension means permits movement of said first body structure in directions generally parallel to said line of centers, and wherein said deflectable suspension means precludes movement of said second body structure in directions generally parallel to said line of centers.

3. Apparatus according to claim 1 and further comprising motion transmitting means operatively connected to said motor means and said body means for moving said body means, said motion transmitting means comprising eccentric drive means, linkage means operatively connected to said drive means and to said body means, wherein said motor means is effective for actuating said eccentric drive means, wherein said eccentric drive means is effective for actuating said linkage means, and wherein said linkage means is effective for moving said body means.

4. Apparatus according to claim 1 wherein said deflectable suspension means comprises a generally vertically extending movable support linkage having generally a first upper disposed functional end and having generally a second lower disposed functional end, wherein said first end is operatively pivotally connected to an associated fixed structure, and wherein said second end is operatively pivotally connected to said body means.

5. Apparatus according to claim 1 wherein said deflectable suspension means comprises a plurality of generally vertically extending movable support linkages each having a generally first upper disposed functional end and each having a generally second lower disposed functional end, wherein each of said first ends is operatively connected to associated support structure, and wherein each of said second ends is operatively connected to said body means.

6. Apparatus according to claim 5 wherein said body means comprises a first generally relatively inner situated body having at least first and second side members generally parallel to each other and fixedly spaced from each other, wherein each of said first and second side members is of a length substantially greater in dimension than the distance between said fixedly spaced first and second side members, wherein said body means further comprises a second generally relatively outer situated body having at least third and fourth side members generally parallel to each other and fixedly spaced from each other, wherein each of said third and fourth side members is of a length substantially greater in dimension than the distance between said fixedly spaced third and fourth side members, and roller means operatively interconnecting said first and second bodies, said roller means providing for relative movement between said first and second bodies in directions generally parallel to said first and second side members and to said third and fourth side members.

7. Apparatus according to claim 6 wherein said roller means comprises first and second rollers operatively carried by said first side member in a manner as to be spaced from each other, a support surface carried by said third side member, wherein said first and second rollers are rollingly engaged with said support surface as to be generally vertically supported by said support surface, wherein said roller means further comprises third and fourth rollers operatively carried by said second side member in a manner as to be spaced from each other, a second support surface carried by said fourth side member, and wherein said third and fourth rollers are rollingly engaged with said second support surface as to be generally vertically supported by said second support surface.

8. Apparatus according to claim 6 wherein said roller means comprises first and second as well as third and fourth rollers operatively carried by said first side member in a manner as to be spaced from each other, a first support surface carried by said third side member, wherein said first and second as well as said third and fourth rollers are rollingly engaged with said first support surface as to be generally vertically supported by said first support surface, wherein said roller means further comprises fifth and sixth as well as seventh and eighth rollers operatively carried by said second side member in a manner as to be spaced from each other, a second support surface carried by said fourth side member, and wherein said fifth and sixth as well as said seventh and eighth rollers are rollingly engaged with said second support surface as to be generally vertically supported by said second support surface.

9. Apparatus according to claim 6 wherein said roller means comprises first and second as well as third and fourth rollers operatively carried by said first side member in a manner as to be spaced from each other, a first support surface carried by said third side member, wherein said first roller comprises a first axis of rotation about which said first roller rotates, wherein said first axis of rotation extends generally horizontally as to be generally parallel to said first support surface, wherein said second roller comprises a second axis of rotation about which said second roller rotates, wherein said second axis of rotation extends generally horizontally as to be generally parallel to said first support surface and to said first axis of rotation, wherein said third roller comprises a third axis of rotation about which said third roller rotates, wherein said third axis of rotation extends generally parallel to said first support surface and to said first axis and to said second axis, wherein said fourth roller comprises a fourth axis of rotation about which said fourth roller rotates, wherein said fourth axis of rotation extends generally horizontally as to be generally parallel to said first support surface and to said first axis and to said second axis and to said third axis, wherein said roller means further comprises fifth and sixth as well as seventh and eighth rollers operatively carried by said second side member in a manner as to be spaced from each other, a second support surface carried by said fourth side member, wherein said fifth roller comprises a fifth axis of rotation about which said fifth roller rotates, wherein said fifth axis of rotation extends generally horizontally as to be generally parallel to said second support surface and to said first axis and said second axis as well as said third axis and said fourth axis, wherein said sixth roller comprises a sixth axis of rotation about which said sixth roller rotates, wherein said sixth axis of rotation extends generally horizontally as to be generally parallel to said second support surface and to said fifth axis of rotation, wherein said seventh roller comprises a seventh axis of rotation about which said seventh roller rotates, wherein said seventh axis of rotation extends generally horizontally as to be generally parallel to said second support surface and to said fifth axis and said sixth axis of rotation, wherein said eighth roller comprises an eighth axis of rotation about which said eighth roller rotates, wherein said eighth axis of rotation extends generally horizontally as to be generally parallel to said second support surface and to said fifth axis and said sixth axis as well as said seventh axis, wherein said first and second rollers as well as said third and fourth rollers are rollingly supported upon said first support surface, and wherein said fifth and sixth rollers as well as said seventh and eighth rollers are rollingly supported upon said second support surface.

10. Apparatus according to claim 8 and further comprising a first longitudinally extending abutment surface carried by said third side member, a second longitudinally extending abutment surface carried by said fourth side member, a plurality of first guide rollers carried by said first side member as to be spaced from each other, a plurality of second guide rollers carried by said second side member as to be spaced from each other, wherein said plurality of first guide rollers is effective for rolling engagement against said first longitudinally extending abutment surface, and wherein said plurality of second guide rollers is effective for rolling engagement against said second longitudinally extending abutment surface.

11. Apparatus for causing a continuously moving conveyor to have a portion of said conveyor become functionally standing still with respect to a selected area for a selected span of time, comprising body means, track means operatively carried by said body means for providing a generally vertical support for said continuously moving conveyor, when viewed from above said track means is seen to comprise a first curvilinear track portion and a second curvilinear track portion, an intermediate track portion operatively connecting said first curvilinear track portion to said second curvilinear track portion, wherein said continuously moving conveyor in its course of movement is first operatively vertically supported by and guided by said first curvilinear track portion and continues in a first direction generally along said intermediate track portion from said first curvilinear track portion and toward said second curvilinear track portion, wherein said continuously moving conveyor in its continued course of movement continues its movement from said intermediate track portion and onto said second curvilinear track portion which continues to operatively vertically support said moving conveyor, wherein at times that portion of the continuously moving conveyor which is between said first curvilinear track portion and said second curvilinear track portion is operatively engaged to a carrier and continues to move with said carrier at the same speed as the overall continuously moving conveyor, motor means operatively connected to said body means, said motor means being at times effective to move said body means and said first curvilinear track portion and said second curvilinear track portion in a second direction opposite to said first direction and at a speed which is substantially equal to the speed of said continuously moving conveyor, and further comprising deflectable suspension means operatively supporting said body means and said first and second curvilinear track portions, wherein said first curvilinear track portion has a first center of curvature, wherein said second curvilinear track portion has a second center of curvature, and wherein said deflectable suspension means enables said body means and said first and second curvilinear track portions to undergo motion transverse to a line of centers of said first and second centers of curvature.

12. Apparatus for causing a continuously moving conveyor to have a portion of said conveyor become functionally standing still with respect to a selected area for a selected span of time, comprising body means, track means operatively carried by said body means for providing a generally vertical support for said continuously moving conveyor, when viewed from above said track means is seen to comprise a first curvilinear track portion and a second curvilinear track portion, an intermediate track portion operatively connecting said first curvilinear track portion to said second curvilinear track portion, wherein said continuously moving conveyor in its course of movement is first operatively vertically supported by and guided by said first curvilinear track portion and continues in a first direction generally along said intermediate track portion from said first curvilinear track portion and toward said second curvilinear track portion, wherein said continuously moving conveyor in its continued course of movement continues its movement from said intermediate track portion and onto said second curvilinear track portion which continues to operatively vertically support said moving conveyor, wherein at times that portion of the continuously moving conveyor which is between said first curvilinear track portion and said second curvilinear track portion is operatively engaged to a carrier and continues to move with said carrier at the same speed as the overall continuously moving conveyor, motor means operatively connected to said body means, said motor means being at times effective to move said body means and said first curvilinear track portion and said second curvilinear track portion in a second direction opposite to said first direction and at a speed which is substantially equal to the speed of said continuously moving conveyor, and further comprising a first guide wheel and a second guide wheel, wherein said first and second guide wheels are carried by said body means, deflectable suspension means operatively supporting said body means and said first and second guide wheels, wherein said first guide wheel has a first axis of rotation, wherein said first curvilinear track portion has its curve generally about said first axis of rotation, wherein said second guide wheel has a second axis of rotation, wherein said second curvilinear track portion has its curve generally about said second axis of rotation, wherein both said first and second guide wheels are effective for at least at times operatively engaging portions carried by said conveyor as said moving conveyor moves along said first and second curvilinear track portions, wherein said body means comprises a first body structure and a second body structure, wherein said first and second guide wheels are operatively carried by said first body structure, wherein said deflectable suspension means enables both said first body structure and said second body structure to move in directions transverse to a line of centers passing through said first and second axes of rotation, wherein said deflectable suspension means permits movement of said first body structure in directions generally parallel to said line of centers, and wherein said deflectable suspension means precludes movement of said second body structure in directions generally parallel to said line of centers.

13. Apparatus according to claim 1 and further comprising a plurality of additional carriers in addition to the first mentioned carrier, wherein said first mentioned carrier comprises a depending bucket-like structure operatively connected to and moved by said continuously moving conveyor, and wherein said plurality of additional carriers comprises a plurality of depending bucket-like structures operatively connected to and moved by said continuously involving conveyor.

14. Apparatus according to claim 1 wherein when said first rotatable wheel and said second rotatable wheel move in said second direction said first and second rotatable wheels move in unison with each other.

15. Apparatus according to claim 1 wherein said motor means starts to move said body means in said second direction only when said carrier attains a preselected position relative to said body means.

16. Apparatus according to claim 1 wherein when said first rotatable wheel and said second rotatable wheel move in said second direction said first and second rotatable wheels move in unison with each other, and wherein said motor means starts to move said first and second rotatable a wheels in said second direction only when said carrier attains a preselected position relative to said body means.

17. Apparatus according to claim 1 wherein when said carrier attains a preselected position relative to said body means said motor means moves said first and second rotatable wheels in said second direction for a selected distance from a home position, and wherein upon the passage of a preselected span of time said first and second rotatable wheels are moved through said selected distance back to said home position.

18. Apparatus according to claim 1 and further comprising a plurality of additional carriers in addition to the first mentioned carrier, wherein said first mentioned carrier comprises a depending bucket-like structure operatively connected to and moved by said continuously moving conveyor, wherein said plurality of additional carriers comprises a plurality of depending bucket-like structures operatively connected to and moved by said continuously moving conveyor, wherein said motor means starts to move said body means in said second direction when either said first mentioned carrier or any of said plurality of additional carriers attains a preselected position relative to said body means.

19. Apparatus for causing a continuously moving conveyor to have a portion of said conveyor become functionally standing still with respect to a selected area for a selected span of time, comprising body means, a first rotatable wheel carried by said body means, a second rotatable wheel carried by said body means, wherein said first and second rotatable wheels are each suitably secured to said body means for rotatable motion with respect to said body means, wherein said first and second rotatable wheels are so situated as to be substantially spaced from each other a preselected distance, wherein the planes of rotation of said first and second rotatable wheels are generally coplanar, wherein said continuously moving conveyor in its course of movement first operatively engages a portion of said first rotatable wheel and continues in a first direction generally tangentially from said first rotatable wheel to operative engagement with said second rotatable wheel tangentially thereof, wherein that portion of said moving conveyor which leaves tangentially from said first rotatable wheel and first tangentially engages said second rotatable wheel operatively carries a carrier and moves at the same speed as the overall continuously moving conveyor, means for at times moving said body means and said first rotatable wheel and said second rotatable wheel in a second direction opposite to said first direction and at a speed which is generally equal to the speed of said continuously moving conveyor, suspension means operatively supporting said body means and said first and second wheels, wherein said first and second wheels define a line of centers, and wherein said suspension means enables said body means and said first and second wheels to undergo motion transverse to said line of centers.

20. Apparatus according to claim 19 and further comprising a plurality of additional carriers in addition to the first mentioned carrier, wherein said first mentioned carrier comprises a depending bucket-like structure operatively connected to and moved by said continuously moving conveyor, and wherein said plurality of additional carriers comprises a plurality of depending bucket-like structures operatively connected to and moved by said continuously moving conveyor.

21. Apparatus according to claim 19 wherein when said first rotatable wheel and said second rotatable wheel move in said second direction said first and second rotatable wheels move in unison with each other.

22. Apparatus according to claim 19 wherein said means for at times moving said body means starts to move said body means in said second direction only when said carrier attains a preselected position relative to said body means.

23. Apparatus according to claim 19 wherein when said first rotatable wheel and said second rotatable wheel move in said second direction said first and second rotatable wheels move in unison with each other, and wherein said means for at times moving said body means starts to move said first and second rotatable wheels in said second direction only when said carrier attains a preselected position relative to said body means.

24. Apparatus according to claim 19 wherein when said carrier attains a preselected position relative to said body means said means for at times moving said body means moves said first and second rotatable wheels in said second direction for a selected distance from a home position, and wherein upon the passage of a preselected span of time said first and second rotatable wheels are moved through said selected distance back to said home position.

25. Apparatus according to claim 19 and further comprising a plurality of additional carriers in addition to the first mentioned carrier, wherein said first mentioned carrier comprises a depending bucket-like structure operatively connected to and moved by said continuously moving conveyor, wherein said plurality of additional carriers comprises a plurality of depending bucket-like structures operatively connected to and moved by said continuously moving conveyor, wherein said means for at times moving said body means starts to move said body means in said second direction when either said first mentioned carrier or any of said plurality of additional carriers attains a preselected position relative to said body means.

26. Apparatus according to claim 19 wherein said body means comprises a first body structure and a second body structure, wherein said first and second rotatable wheels are operatively carried by said first body structure, wherein said suspension means enables both said first body structure and said second body structure to move in directions transverse to said line of centers, wherein said suspension means permits movement of said first body structure in directions generally parallel to said line of centers, and wherein said suspension means precludes movement of said second body structure in directions generally parallel to said line of centers.

27. Apparatus according to claim 19 and further comprising motion transmitting means operatively connected to said means for at times moving said body means and to said body means, said motion transmitting means comprising eccentric drive means, linkage means operatively connected to said drive means and to said body means, wherein said means for at times moving said body means is effective for actuating said eccentric drive means, wherein said eccentric drive means is effective for actuating said linkage means, and wherein said linkage means is effective for moving said body means.

28. Apparatus according to claim 19 wherein said suspension means comprises a generally vertically extending movable support linkage having generally a first upper disposed functional end and having generally a second lower disposed functional end, wherein said first end is operatively pivotally connected to an associated fixed structure, and wherein said second end is operatively pivotally connected to said body means.

29. Apparatus according to claim 19 wherein said suspension means comprises a plurality of generally vertically extending movable support linkages each having a generally first upper disposed functional end and each having a generally second lower disposed functional end, wherein each of said first ends is operatively connected to associated support structure, and wherein each of said second ends is operatively connected to said body means.

30. Apparatus according to claim 29 wherein said body means comprises a first generally relatively inner situated body having at least first and second side members generally parallel to each other and fixedly spaced from each other, wherein each of said first and second side members is of a length substantially greater in dimension than the distance between said fixedly spaced first and second side members, wherein said body means further comprises a second generally relatively outer situated body having at least third and fourth side members generally parallel to each other and fixedly spaced from each other, wherein each of said third and fourth side members is of a length substantially greater in dimension than the distance between said fixedly spaced third and fourth side members, and roller means operatively interconnecting said first and second bodies, said roller means providing for relative movement between said first and second bodies in directions generally parallel to said first and second side members and to said third and fourth side members.

31. Apparatus according to claim 30 wherein said roller means comprises first and second rollers operatively carried by said first side member in a manner as to be spaced from each other, a support surface carried by said third side member, wherein said first and second rollers are rollingly engaged with said support surface as to be generally vertically supported by said support surface, wherein said roller means further comprises third and fourth rollers operatively carried by said second side member in a manner as to be spaced from each other, a second support surface carried by said fourth side member, and wherein said third and fourth rollers are rollingly engaged with said second support surface as to be generally vertically supported by said second support surface.

32. Apparatus according to claim 30 wherein said roller means comprises first and second as all as third and fourth rollers operatively carried by said first side member in a manner as to be spaced from each other, a first support surface carried by said third side member, wherein said first and second as well as said third and fourth rollers are rollingly engaged with said first support surface as to be generally vertically supported by said first support surface, wherein said roller means further comprises fifth and sixth as well as seventh and eighth rollers operatively carried by said second side member in a manner as to be spaced from each other, a second support surface carried by said fourth side member, and wherein said fifth and sixth as well as said seventh and eighth rollers are rollingly engaged with said second support surface as to be generally vertically supported by said second support surface.

33. Apparatus according to claim 32 and further comprising a first longitudinally extending abutment surface carried by said third side member, a second longitudinally extending abutment surface carried by said fourth side member, a plurality of first guide rollers carried by said first side member as to be spaced from each other, a plurality of second guide rollers carried by said second side member as to be spaced from each other, wherein said plurality of first guide rollers is effective for rolling engagement against said first longitudinally extending abutment surface, and wherein said plurality of second guide rollers is effective for rolling engagement against said second longitudinally extending abutment surface.

34. Apparatus for causing a continuously moving conveyor to have a portion of said conveyor become functionally standing still with respect to a selected area for a selected span of time, comprising body means, a first rotatable wheel carried by said body means, a second rotatable wheel carried by said body means, wherein said first and second rotatable wheels are each suitably secured to said body means for rotatable motion with respect to said body means, wherein said first and second rotatable wheels are so situated as to be substantially spaced from each other a preselected distance, wherein the planes of rotation of said first and second rotatable wheels are generally coplanar, wherein said continuously moving conveyor in its course of movement first operatively engages a portion of said first rotatable wheel and continues in a first direction generally tangentially from said first rotatable wheel to operative engagement with said second rotatable wheel tangentially thereof, wherein that portion of said moving conveyor which leaves tangentially from said first rotatable wheel and first tangentially engages said second rotatable wheel operatively carries a carrier and moves at the same speed as the overall continuously moving conveyor, means for at times moving said body means and said first rotatable wheel and said second rotatable wheel in a second direction opposite to said first direction and at a speed which is generally equal to the speed of said continuously moving conveyor, wherein said body means comprises a first generally relatively inner situated body having at least first and second side members generally parallel to each other and fixedly spaced from each other, wherein each of said first and second side member is of a length substantially greater in dimension than the distance between said fixedly spaced first and second side members, wherein said body means further comprises a second generally relatively outer situated body having at least third and fourth side members generally parallel to each other and fixedly spaced from each other, wherein each of said third and fourth side members is of a length substantially greater in dimension than the distance between said fixedly spaced third and fourth side members, and roller means operatively interconnecting said first and second bodies, said roller means providing for relative movement between said first and second bodies in directions generally parallel to said first and second side members and to said third and fourth side members.

35. Apparatus according to claim 34 wherein said roller means comprises first and second rollers operatively carried by said first side member in a manner as to be spaced from each other, a support surface carried by said third side member, wherein said first and second rollers are rollingly engaged with said support surface as to be generally vertically supported by said support surface, wherein said roller means further comprises third and fourth rollers operatively carried by said second side member in a manner as to be spaced from each other, a second support surface carried by said fourth side member, and wherein said third and fourth rollers are rollingly engaged with said second support surface as to be generally vertically supported by said second support surface.

36. Apparatus according to claim 34 wherein said roller means comprises first and second as well as third and fourth rollers operatively carried by said first side member in a manner as to be spaced from each other, a first support surface carried by said third side member, wherein said first and second as well as said third and fourth rollers are rollingly engaged with said first support surface as to be generally vertically supported by said first support surface, wherein said roller means further comprises fifth and sixth as well as seventh and eighth rollers operatively carried by said second side member in a manner as to be spaced from each other, a second support surface carried by said fourth side member, and wherein said fifth and sixth as well as said seventh and eighth rollers are rollingly engaged with said second support surface as to be generally vertically supported by said second support surface.

37. Apparatus according to claim 36 and further comprising a first longitudinally extending abutment surface carried by said third side member, a second longitudinally extending abutment surface carried by said fourth side member, a plurality of first guide rollers carried by said first side member as to be spaced from each other, a plurality of second guide rollers carried by said second side member as to be spaced from each other, wherein said plurality of first guide rollers is effective for rolling engagement against said first longitudinally extending abutment surface, and wherein said plurality of second guide rollers is effective for rolling engagement against said second longitudinally extending abutment surface.

38. Apparatus according to claim 11 and further comprising a plurality of additional carriers in addition to the first mentioned carrier, wherein said first mentioned carrier comprises a depending bucket-like structure operatively connected to and moved by said continuously moving conveyor, and wherein said plurality of additional carriers comprises a plurality of depending bucket-like structures operatively connected to and moved by said continuously moving conveyor.

39. Apparatus according to claim 11 wherein when said first curvilinear track portion and said second curvilinear track portion move in said second direction said first and second curvilinear track portions move in unison with each other.

40. Apparatus according to claim 11 wherein said motor means starts to move said body means in said second direction only when said carrier attains a preselected position relative to said body means.

41. Apparatus according to claim 11 wherein when said first curvilinear track portion and said second curvilinear track portion move in said second direction said first and second curvilinear track portions move in unison with each other, and wherein said motor means starts to move said first and second curvilinear track portions in said second direction only when said carrier attains a preselected position relative to said body means.

42. Apparatus according to claim 11 wherein when said carrier attains a preselected position relative to said body means said motor means moves said first and second curvilinear track portions in said second direction for a selected distance from a home position, and wherein upon the passage of a preselected span of time said first and second curvilinear track portions are moved through said selected distance back to said home position.

43. Apparatus according to claim 11 and further comprising a plurality of additional carriers in addition to the first mentioned carrier, wherein said first mentioned carrier comprises a depending bucket-like structure operatively connected to and moved by said continuously moving conveyor, wherein said plurality of additional carriers comprises a plurality of depending bucket-like structures operatively connected to and moved by said continuously moving conveyor, wherein said motor means starts to move said body means in said second direction when either said first mentioned carrier or any of said plurality of additional carriers attains a preselected position relative to said body means.

44. Apparatus according to claim 11 wherein said deflectable suspension means comprises a generally vertically extendable movable support linkage having generally a first upper disposed functional end and having generally a second lower disposed functional end, wherein said first end is operatively pivotally connected to an associated fixed structure, and wherein said second end is operatively pivotally connected to said body means.

45. Apparatus according to claim 11 wherein said deflectable suspension means comprises a plurality of generally vertically extending movable support linkages each having a generally first upper disposed functional end and each having a generally second lower disposed functional end, wherein each of said first ends is operatively connected to associated support structure, and wherein each of said second end is operatively connected to said body means.

46. Apparatus according to claim 45 wherein said body means comprises a first generally relatively inner situated body having at least first and second side members generally parallel to each other and fixedly spaced from each other, wherein each of said first and second side members is of a length substantially greater in dimension than the distance between said fixedly spaced first and second side members, wherein said body means further comprises a second generally relatively outer situated body having at least third and fourth side members generally parallel to each other and fixedly spaced from each other, wherein each of said third and fourth side members is of a length substantially greater in dimension than the distance between said fixedly spaced third and fourth side members, and roller means operatively interconnecting said first and second bodies, said roller means providing for relative movement between said first and second bodies in directions generally parallel to said first and second side members and to said third and fourth side members.

47. Apparatus according to claim 46 wherein said roller means comprises first and second rollers operatively carried by said first side member in a manner as to be spaced from each other, a support surface carried by said third side member, wherein said first and second rollers are rollingly engaged with said support surface as to be generally vertically supported by said support surface, wherein said roller means further comprises third and fourth rollers operatively carried by said second side member in a manner as to be spaced from each other, a second support surface carried by said fourth side member, and wherein said third and fourth rollers are rollingly engaged with said second support surface as to be generally vertically supported by said second support surface.

48. Apparatus according to claim 46 wherein said roller means comprises first and second as well as third and fourth rollers operatively carried by said first side member in a manner as to be spaced from each other, a first support surface carried by said third side member, wherein said first and second as well as said third and fourth rollers are rollingly engaged with said first support surface as to be generally vertically supported by said first support surface, wherein said roller means further comprises fifth and sixth as well as seventh and eighth rollers operatively carried by said second side member in a manner as to be spaced from each other, a second support surface carried by said fourth side member, and wherein said fifth and sixth as well as said seventh and eighth rollers are rollingly engaged with said second support surface as to be generally vertically supported by said second support surface.

49. Apparatus according to claim 48 and further comprising a first longitudinally extending abutment surface carried by said third side member, a second longitudinally extending abutment surface carried by said fourth side member, a plurality of first guide rollers carried by said first side member as to be spaced from each other, a plurality of second guide rollers carried by said second side member as to be spaced from each other, wherein said plurality of first guide rollers is effective for rolling engagement against said first longitudinally extending abutment surface, and wherein said plurality of second guide rollers is effective for rolling engagement against said second longitudinally extending abutment surface.

50. Apparatus according to claim 11 and further comprising a first guide wheel and a second guide wheel, wherein said first and second wheels are carried by said body means, wherein said first guide wheel has a first axis of rotation, wherein said first curvilinear track portion has its curvature generally about said first axis of rotation, wherein said second guide wheel has a second axis of rotation, wherein said second curvilinear track portion has its curvature generally about said second axis of rotation, and wherein both said first and second guide wheels are effective for at least at times operatively engaging portions carried by said conveyor as said moving conveyor moves along said first and second curvilinear track portions.

51. Apparatus for causing a continuously moving conveyor to have a portion of said conveyor become functionally standing still with respect to a selected area for a selected span of time, comprising body means, track means operatively carried by said body means for providing a generally vertical support for said continuously moving conveyor, when viewed from above said track means is seen to comprise a first curvilinear track portion and a second curvilinear track portion, an intermediate track portion operatively connecting said first curvilinear track portion to said second curvilinear track portion, wherein said continuously moving conveyor in its course of movement is first operatively vertically supported by and guided by said first curvilinear track portion and continues in a first direction generally along said intermediate track portion from said first curvilinear track portion and toward said second curvilinear track portion, wherein said continuously moving conveyor in its continued course of movement continues its movement from said intermediate track portion and onto said second curvilinear track portion which continues to operatively vertically support said moving conveyor, wherein at times that portion of the continuously moving conveyor which is between said first curvilinear track portion and said second curvilinear track portion is operatively engaged to a carrier and continues to move with said carrier at the same speed as the overall continuously moving conveyor, means for at times moving said body means and said first curvilinear track portion and said second curvilinear track portion in a second direction opposite to said first direction and at a speed which is generally equal to the speed of said continuously moving conveyor, and further comprising suspension means operatively supporting said body means and said first and second curvilinear track portions, wherein said first curvilinear track portion has a first center of curvature, wherein said second curvilinear track portion has a second center of curvature, and wherein said suspension means enables said body means and said first and second curvilinear track portions to undergo motion transverse to a line of centers of said first and second centers of curvature.

52. Apparatus according to claim 51 and further comprising a plurality of additional carriers in addition to the first mentioned carrier, wherein said first mentioned carrier comprises a depending bucket-like structure operatively connected to and moved by said continuously moving conveyor, and wherein said plurality of additional carriers comprises a plurality of depending bucket-like structures operatively connected to and moved by said continuously moving conveyor.

53. Apparatus according to claim 51 wherein when said first curvilinear track portion and said second curvilinear track portion move in said second direction said first and second curvilinear track portions move in unison with each other.

54. Apparatus according to claim 51 wherein said means for at times moving said body means starts to move said body means in said second direction only when said carrier attains a preselected position relative to said body means.

55. Apparatus according to claim 51 wherein when said first curviliner track portion and said second curvilinear track portion move in said second direction said first and second curvilinear track portions move in unison with each other, and wherein said means for at times moving said body means starts to move said first and second curvilinear track portions in said second direction only when said carrier attains a preselected position relative to said body means.

56. Apparatus according to claim 51 wherein when said carrier attains a preselected position relative to said body means said means for at times moving said body means moves said first and second curvilinear track portions in said second direction for a selected distance from a home position, and wherein upon the passage of a preselected span of time said first and second curvilinear track portions are moved through said selected distance back to said home position.

57. Apparatus according to claim 51 and further comprising a plurality of additional carriers in addition to the first mentioned carrier, wherein said first mentioned carrier comprises a depending bucket-like structure operatively connected to and moved by said continuously moving conveyor, wherein said plurality of additional carriers comprises a plurality of depending bucket-like structures operatively connected to and moved by said continuously moving conveyor, wherein said means for at times moving said body means starts to move said body means in said second direction when either said first mentioned carrier or any of said plurality of additional carriers attains a preselected position relative to said body means.

58. Apparatus according to claim 51 wherein said suspension means comprises a generally vertically extending movable support linkage having generally a first upper disposed functional end and having generally a second lower disposed functional end, wherein said first end is operatively pivotally connected to an associated fixed structure, and wherein said second end is operatively pivotally connected to said body means.

59. Apparatus according to claim 51 wherein said suspension means comprises a plurality of generally vertically extending movable support linkages each having a generally first upper disposed functional end and each having a generally second lower disposed functional end, wherein each of said first ends is operatively connected to associated support structure, and wherein each of said second ends is operatively connected to said body means.

60. Apparatus according to claims 59 wherein said body means comprises a first generally relatively inner situated body having at least first and second side members generally parallel to each other and fixedly spaced from each other, wherein each of said first and second side members is of a length substantially greater in dimension than the distance between said fixedly spaced first and second side members, wherein said body means further comprises a second generally relatively outer situated body having at least third and fourth side members generally parallel to each other and fixedly spaced from each other, wherein each of said third and fourth side members is of a length substantially greater in dimension than the distance between said fixedly spaced third and fourth side members, and roller means operatively interconnecting said first and second bodies, said roller means providing for relative movement between said first and second bodies in directions generally parallel to said first and second side members and to said third and fourth side members.

61. Apparatus according to claim 60 wherein said roller means comprises first and second rollers operatively carried by said first side member in a manner as to be spaced from each other, a support surface carried by said third side member, wherein said first and second rollers are rollingly engaged with said support surface as to be generally vertically supported by said support surface, wherein said roller means further comprises third and fourth rollers operatively carried by said second side member in a manner as to be spaced from each other, a second support surface carried by said fourth side member, and wherein said third and fourth rollers are rollingly engaged with said second support surface as to be generally vertically supported by said second support surface.

62. Apparatus according to claim 60 wherein said roller means comprises first and second as well as third and fourth rollers operatively carried by said first side member in a manner as to be spaced from each other, a first support surface carried by said third side member, wherein said first and second as well as said third and fourth rollers are rollingly engaged with said first support surface as to be generally vertically supported by said first support surface, wherein said roller means further comprises fifth and sixth as well as seventh and eighth rollers operatively carried by said second side member in a manner as to be spaced from each other, a second support surface carried by said fourth side member, and wherein said fifth and sixth as well as said seventh and eighth rollers are rollingly engaged with said second support surface as to be generally vertically supported by said second support surface.

63. Apparatus according to claim 62 and further comprising a first longitudinally extending abutment surface carried by said third side member, a second longitudinally extending abutment surface carried by said fourth side member, a plurality of first guide rollers carried by said first side member as to be spaced from each other, a plurality of second guide rollers carried by said second side member as to be spaced from each other, wherein said plurality of first guide rollers is effective for rolling engagement against said first longitudinally extending abutment surface, and wherein said plurality of second guide rollers is effective for rolling engagement against said second longitudinally extending abutment surface.

64. Apparatus according to claim 51 and further comprising a first guide wheel and a second guide wheel, wherein said first and second wheels are carried by said body means, wherein said first guide wheel has a first axis of rotation, wherein said first curvilinear track portion has its curvature generally about said first axis of rotation, wherein said second guide wheel has a second axis of rotation, wherein said second curvilinear track portion has its curvature generally about said second axis of rotation, and wherein both said first and second guide wheels are effective for at least at times operatively engaging portions carried by said conveyor as said moving conveyor moves along said first and second curvilinear track portions.

* * * * *

UNITED STATES PATENT AND TRADEMARK OFFICE
CERTIFICATE OF CORRECTION

PATENT NO. : 5,620,080
DATED : April 15, 1997
INVENTOR(S) : Steven M. Kassuba It is certified that error appears in the above-identified patent and that said Letters Patent is hereby corrected as shown below:

Column 8, line 30 (Claim 1, line 18 thereof), change "tangentsally" to --- tangentially ---.

Column 12, line 34 (Claim 13, line 8 thereof), change "involving" to --- moving ---.

Column 12, line 48 (Claim 16, line 5 thereof), after "rotatable" delete "a".

Column 15, line 20 (Claim 32, line 2 thereof), change "all" to --- well ---.

Column 17, line 63 (Claim 45, line 8 thereof), change "end" to --- ends ---.

Signed and Sealed this

Twenty-fourth Day of June, 1997

Attest:

*Attesting Officer*

BRUCE LEHMAN
*Commissioner of Patents and Trademarks*